(12) United States Patent
Zhuang et al.

(10) Patent No.: US 10,284,281 B2
(45) Date of Patent: May 7, 2019

(54) RESOURCE SHARING IN RELAY OPERATIONS WITHIN WIRELESS COMMUNICATION SYSTEMS

(71) Applicant: Google Technology Holdings LLC, Mountain View, CA (US)

(72) Inventors: Xiangyang Zhuang, Lake Zurich, IL (US); Robert T. Love, Barrington, IL (US); Vijay Nangia, Algonquin, IL (US); Ajit Nimbalker, Arlington Heights, IL (US); Kenneth A. Stewart, Grayslake, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 80 days.

(21) Appl. No.: 14/789,352

(22) Filed: Jul. 1, 2015

(65) Prior Publication Data
US 2015/0304017 A1  Oct. 22, 2015

Related U.S. Application Data

(62) Division of application No. 12/269,853, filed on Nov. 12, 2008, now abandoned.

(51) Int. Cl.
*H04B 7/155* (2006.01)
*H04W 72/04* (2009.01)
(Continued)

(52) U.S. Cl.
CPC ..... *H04B 7/15542* (2013.01); *H04B 7/15507* (2013.01); *H04L 5/0032* (2013.01);
(Continued)

(58) Field of Classification Search
CPC ........... H04B 7/15507; H04B 7/15542; H04W 72/04; H04W 88/04; H04W 72/1278;
(Continued)

(56) References Cited

U.S. PATENT DOCUMENTS

2008/0095038 A1* 4/2008 Chang ................ H04B 7/15542
370/208
2008/0112497 A1   5/2008 Shan et al.
(Continued)

FOREIGN PATENT DOCUMENTS

| EP | 1915005 A2 | 4/2008 |
| EP | 1677443 B1 | 5/2009 |
| WO | 2007053954 A1 | 5/2007 |

OTHER PUBLICATIONS

Teo et al.; Adaptive Frame Structure for Mobil Multihop Relay Networks; IEEE ICICS 2007.
(Continued)

*Primary Examiner* — Dang T Ton
(74) *Attorney, Agent, or Firm* — Faegre Baker Daniels LLP (57) ABSTRACT

A wireless communication base station is disclosed. The base station includes a transceiver coupled to a controller configured to generate a sub-frame having first control region for a first set of users and a second control region for a second set of users that do not receive the first control region, the first control region has a fixed starting location within the sub-frame and the second control region has a starting location that is one of several possible starting locations within the sub-frame, wherein the controller is configured to cause the transceiver to transmit the sub-frame to the first and second sets of users without signaling the starting location of the second control region in the sub-frame.

13 Claims, 8 Drawing Sheets

(51) Int. Cl.
*H04W 88/04* (2009.01)
*H04L 5/00* (2006.01)
*H04W 72/00* (2009.01)
*H04W 72/12* (2009.01)
*H04W 84/04* (2009.01)

(52) U.S. Cl.
CPC .......... *H04L 5/0053* (2013.01); *H04L 5/0087* (2013.01); *H04W 72/005* (2013.01); *H04W 72/04* (2013.01); *H04W 72/044* (2013.01); *H04W 72/1278* (2013.01); *H04W 88/04* (2013.01); *H04L 5/0007* (2013.01); *H04L 5/0044* (2013.01); *H04L 5/0094* (2013.01); *H04W 84/047* (2013.01)

(58) Field of Classification Search
CPC .............. H04W 72/044; H04W 84/047; H04L 5/0053; H04L 5/0032; H04L 5/0007; H04L 5/0044; H04L 5/0094
USPC ......................................................... 370/329
See application file for complete search history.

(56) References Cited

U.S. PATENT DOCUMENTS

| | | |
|---|---|---|
| 2008/0181318 A1 | 7/2008 | Kim et al. |
| 2008/0219229 A1* | 9/2008 | Zheng ................ H04B 7/15557 370/338 |
| 2009/0022178 A1* | 1/2009 | Ji .......................... H04L 5/0053 370/470 |
| 2009/0088148 A1* | 4/2009 | Chung .................. H04L 1/0029 455/423 |
| 2009/0303918 A1 | 12/2009 | Ma et al. |
| 2010/0040009 A1* | 2/2010 | Gaal ..................... H04W 28/26 370/329 |
| 2010/0120442 A1 | 5/2010 | Zhuang et al. |
| 2011/0128916 A1* | 6/2011 | Kwon ................... H04W 84/18 370/328 |

OTHER PUBLICATIONS

European Patent Office; International Search Report and Written Opinion; International Application No. PCT/US2009/061789; dated Mar. 26, 2010.

* cited by examiner

RESOURCE SHARING IN RELAY OPERATIONS WITHIN WIRELESS COMMUNICATION SYSTEMS

CROSS REFERENCE TO RELATED APPLICATIONS

The present application is a division of U.S. application Ser. No. 12/269,853, filed on 12 Nov. 2008, the contents of which are incorporated herein by reference and from which benefits are claimed under 35 U.S.C. 120.

FIELD OF THE DISCLOSURE

The present disclosure relates generally to wireless communications and more particularly to resource sharing in wireless communication systems having a base station that communicates with mobile terminals via a relay.

BACKGROUND

Traditionally in cellular networks, a base station (BS), e.g., Node-B or eNB, communicates directly with end user equipment (UE) within the coverage area of the BS (denote these UE as UE1). In relay operations, a Relay or a relay terminal or a Relay Node (RN) first receives information from an eNB on an eNB-to-RN link and then sends out the received information intended for UE that are within the coverage area of the RN (denote these UE generically as UE2 where it is understood that multicasting to a more than one UE's is incorporated). For an "in-band" RN that receives from an eNB on the same band as occupied by the eNB-to-UE1 link, the eNB-to-RN link needs to share resources in time and frequency (or some fraction thereof) with the eNB-to-UE1 link. Conventionally when there is only regular eNB-to-UE1 communications, each UE1 typically receives a control message to determine what resources are allocated to the UE1 and the location of the allocated resources. An RN could, for example, behave like a regular UE (UE1) to receive a control message from an eNB at the same time the eNB transmits a control message to UE1. However, an RN may not be able to receive the control message from the eNB if the RN needs to transmit control information to UE2 at the same time the eNB is transmitting control information to UE1 and the RN.

In the context of the Release-8 specification of Long Term Evolution (LTE) system developed by the Third Generation Partnership Project (3GPP) that is based on Orthogonal Frequency Division Multiplexing (OFDM) for downlink transmissions, the eNB-to-UE1 link consists of typically 1~3 OFDM symbols at the beginning of each 1-ms sub-frame for control channel, i.e., PDCCH, transmissions. Typically an OFDM symbol comprises an integer number of time units (or samples), where a time unit denotes a fundamental reference time duration. For example, in LTE, the time unit corresponds to $1/(15000 \times 2048)$ seconds. Thus, the PDCCH transmissions are a first control region with a fixed starting location (contemporaneously) at the first OFDM symbol in a sub-frame. All the remaining symbols in a sub-frame after the PDCCH are typically for data-carrying traffic, i.e., PDSCH, assigned in multiples of Resource Blocks (RBs). Typically, an RB comprises of a set of subcarriers and a set of OFDM symbols. The smallest resource unit for transmissions is denoted a resource element which is given by the smallest time-frequency resource unit (one subcarrier by one OFDM symbol). For example, an RB may contain 12 subcarriers (with a subcarrier separation of 15 kHz) with 14 OFDM symbols with some subcarriers being assigned as pilot symbols, etc. Typically, the 1 ms sub-frame is divided into two slots, each of 0.5 ms. The RB is sometimes defined in terms of a slot rather than a sub-frame. According to the Release-8 specification, the uplink communication between the UE1 and eNB is based on Single-Carrier Frequency Division Multiple Access (SC-FDMA), which is also referred to as Discrete Fourier Transform (DFT)-spread OFDM. Typically, the RN-to-eNB uplink communication may also be preferably done using SC-FDMA. A virtual resource block is a resource block whose subcarriers are distributed (i.e., non-contiguous) in frequency, whereas a localized RB is an RB whose subcarriers are contiguous in frequency. A virtual RB may have improved performance due to frequency diversity. Release-8 UEs typically share resources in the frequency domain (i.e., on an RB-level or in multiples of an RB) rather than in time in any individual sub-frame on the downlink. Similarly, the eNB-to-RN link may also share resources with the eNB-to-UE1 link in the frequency domain, i.e., on an RB-level or in multiples of an RB. A problem may then occur where the RN is transmitting a PDCCH to its users, i.e., UE2, at the beginning of each sub-frame, making the RN unable to receive the PDCCH transmitted by the eNB at the same time.

The various aspects, features and advantages of the disclosure will become more fully apparent to those having ordinary skill in the art upon careful consideration of the following Detailed Description thereof with the accompanying drawings described below. The drawings may have been simplified for clarity and are not necessarily drawn to scale.

DETAILED DESCRIPTION

Figure 1:
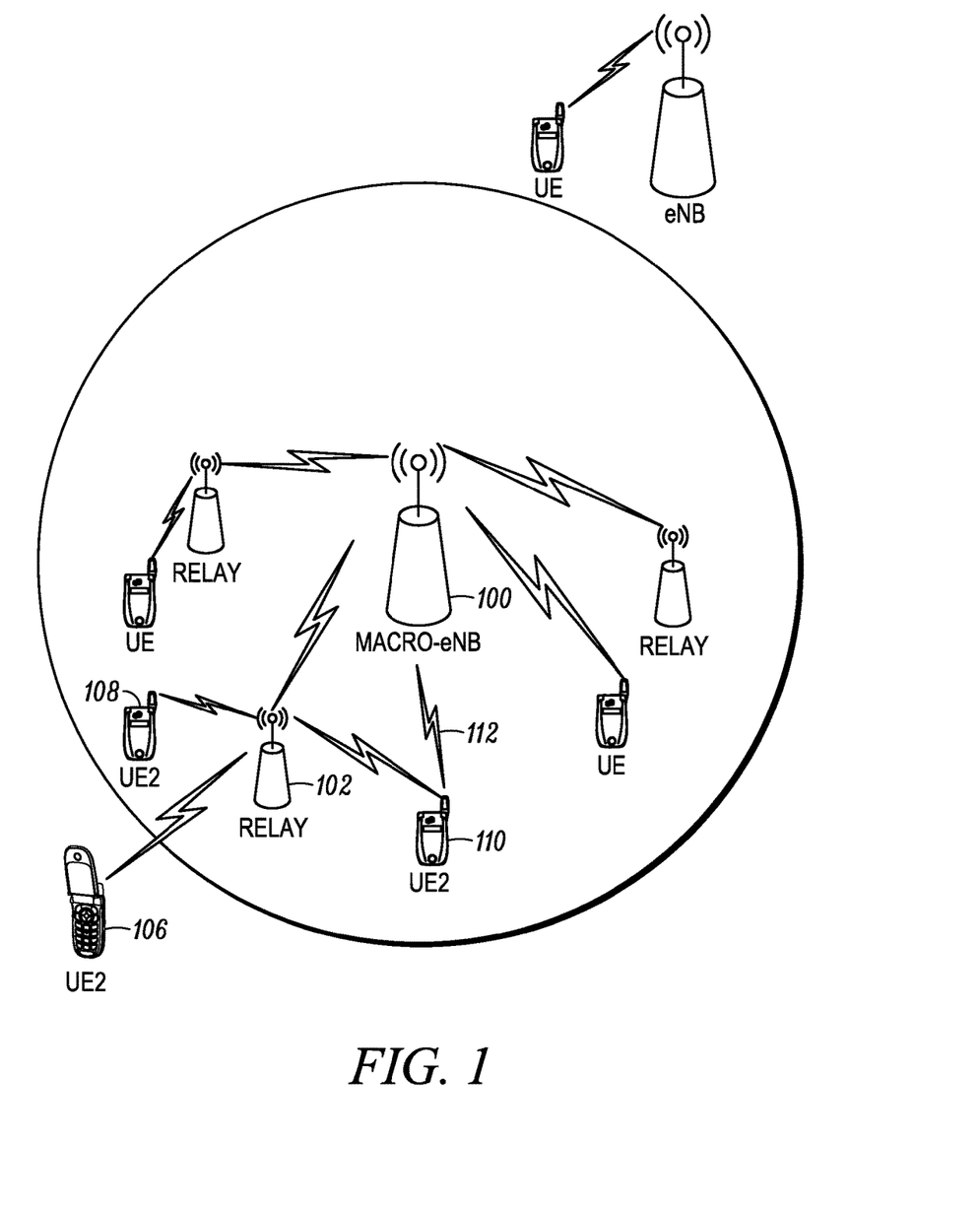
FIG. 1 is a wireless communication system.

In FIG. 1, a wireless communication system comprises one or more fixed base infrastructure units 100 forming a network distributed over a geographical region. The base units may also be referred to as an access point, access terminal, base, base unit, base station (BS), Node-B, eNode-B, eNB, Home Node-B, relay, relay terminal or relay node (RN), or by other terminology used in the art. The base units are generally part of a radio access network (RAN) that includes one or more controller entities communicably coupled to one or more corresponding base units. The RAN is generally coupled to one or more core networks, which may be coupled to other networks, like the Internet and public switched telephone networks, among others. These and other elements of the access and core networks are not illustrated but are known by those having ordinary skill in the art.

In FIG. 1, the one or more base units serve a number of remote units 110 within a serving area, for example, a cell or a cell sector via a wireless communication link 112. The remote units may be fixed units or mobile terminals. The remote unit may also be referred to as a subscriber unit, mobile, mobile station (MS), user terminal, subscriber station, user equipment (UE), terminal, relay node (RN), relay, or by other terminology used in the art. In some deployments, the relay or RN may also be considered as a part of the radio access network (RAN), serving one or more remote units while wirelessly connecting to one or more base units to access one or more core networks.

In FIG. 1, generally, the base units 100 transmit downlink communication signals to serve remote units in the time and/or frequency domain. The remote units communicate directly with the one or more base units via uplink communication signals. Some remote units 106, 108 and 110 communicate with the base unit 100 via relay 102. The one or more base units may comprise one or more transmitters and one or more receivers for downlink and uplink transmissions. The remote units may also comprise one or more transmitters and one or more receivers.

In some implementations, there are instances where the RN is unable to receive a control message from the eNB when the RN transmits control information to UE2 at the same time that the eNB is transmitting control information to UE1, including the RN. Under these circumstances, the RN must get its allocation information from the eNB on a different control channel located with a different time-frequency resource or access method (e.g., a different temporal location, different frequency location, different time-frequency location or using a different spatial signature (e.g., beam-forming vector)) within the sub-frame or the slot. According to one aspect of the disclosure, the RN is configured to detect the location and size of resources assigned for the eNB-to-RN link dynamically. This includes the case where such a link is not provisioned in a particular frame to handle the case where there is no traffic through the RN. The resources used for the eNB-to-RN link are generally scaled with the total traffic needs of all UE2 under the RN's coverage area. For example, in the extreme case where there is no UE2 currently being served through the RN, in theory, no resources are required by the eNB-to-RN link. In other words, the associated control overhead in this case could be minimized or even adjusted to zero so that all resources are made available for the eNB to serve UE1. Generally, the eNB-to-UE1 link and eNB-to-RN link, which includes control and data transmissions, may be multiplexed so that total resources are efficiently shared among UE1 and one or more RN according to the dynamic traffic needs of UE2.

Figure 2:
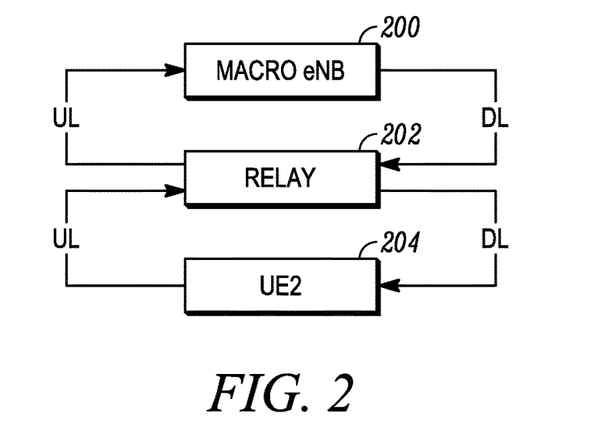
FIG. 2 illustrates a relayed communication link.

FIG. 2 illustrates an exemplary relay link between a Macro eNB 200 and a UE2 204 via a relay 202. In the example, the downlink (DL) resources are co-frequency or adjacent in frequency. The uplink (UL) resources may be configured similarly.

Figure 3:
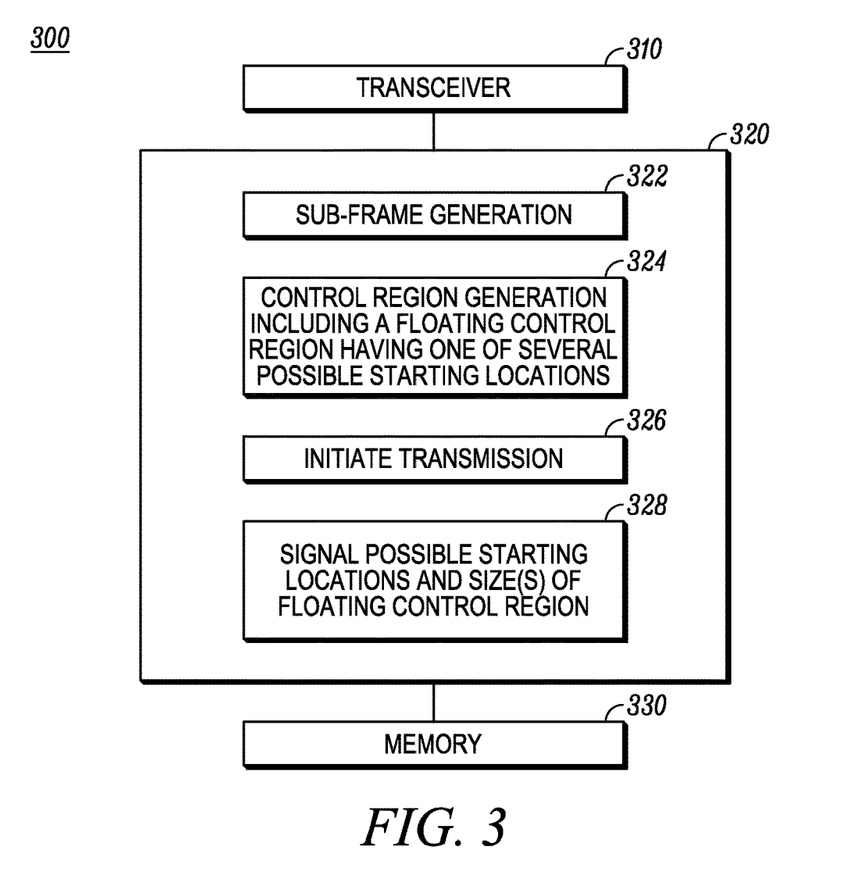
FIG. 3 is a schematic block diagram of a relay node.

In FIG. 3, a wireless communication infrastructure entity 300, for example, an eNB, comprises a transceiver 310 coupled to a controller 320. In one embodiment, the controller is coupled to memory 330 and is embodied as a programmable digital controller capable of executing software of firmware code stored in memory. The code configures the controller to perform functionality discussed more fully below. Alternatively, the controller may be implemented as a hardware equivalent of the exemplary digital controller or as a combination of hardware and software.

The controller includes sub-frame generation functionality 322. Generally the controller generates multiple sub-frames that constitute a frame, which may constitute part of a super-frame. In 3GPP LTE implementations, the sub-frame is an OFDM time-frequency resource. In some system architectures, users do not receive a portion of the sub-frame that includes a control region. In the scenario discussed above, for example, the RN is incapable of receiving at least some part of a control region having a fixed starting location in a portion of the sub-frame when the RN is required to simultaneously transmit to a UE2 during some part of the control region. Thus in some embodiments, the controller is configured with functionality 324 that generates a sub-frame having a first control region for a first set of users and a second control region (SCR) for a second set of users wherein the second set of users may not, in some instances, be able to receive the first control region. The first set of users may be UE1 and the second of users may be one or more RNs. In a more particular implementation, the first control region has a fixed starting location within the sub-frame and the second control region has a starting location that is one of several possible starting locations within the sub-frame. The latter control region may be thought of and referred to as a floating control region. In each sub-frame, the base station controller locates the floating control region in any one of the possible locations, which may be determined by the relay node as discussed more fully below.

The location of floating control region, when it is assigned with non-zero resources, is configured to start from a limited set of possible points within the sub-frame. The set of possible starting locations of the floating control region may be determined as a function of several variables, including parameters that are RN-specific or eNB-specific and some other physical parameters such as modulation and number of resources. In the exemplary 3GPP LTE implementation, the starting location is defined in both the frequency and time domain. In another example, the possible starting locations may be defined by a set of Resource Blocks that are determined as a function of RN-RNTI or as specified by a configuration message, in each RB, the starting location may be given by the Resource Element with the smallest Sub-carrier index and smallest OFDM symbol index. The control region size may be defined as set of REs.

Typically, the control region comprises the control information about the downlink control information (DCI) formats or scheduling messages that may inform the RN of the modulation and coding scheme, transport block sizes, time-frequency resources, pre-coding information, hybrid-ARQ information, RN Identifier, and other control information that is required to decode the downlink data transmissions and enable uplink data transmissions.

In FIG. 3, at 326, the controller includes functionality that causes the transceiver to transmit the one or more sub-frames to the first and second set of users (e.g., UE1 and RN, respectively). In some embodiments where the sub-frame includes a second control region that has a starting location that is one of several possible starting locations within the sub-frame, the controller and more generally the base station may transmit the sub-frame without signaling the actual starting location of the floating control region in the sub-frame.

The starting locations of the floating control region may be either pre-defined in a fixed way or according to some higher-layer configuration message sent to the relay nodes or terminals. Generally, the several possible starting locations of the floating control region are known a priori by the receiving terminal, for example, a relay, that for whatever reason is incapable of receiving the first control region before decoding. In some implementations, at 328 in FIG. 3, the controller is configured to cause the transceiver to signal the several possible starting locations of the floating control region to the relay without signaling the actual starting location of the floating control region. The signaling of the possible starting locations of the floating control region by the base station may be explicit or implicit and must occur prior to the decoding of the sub-frame by the RN. For example, the base station can send a configuration message via high layers to inform an RN of the possible starting locations of the floating control region. The configuration message can be sent during initial system setup or as a dedicated Radio Resource Configuration (RRC) message. The configuration message can also be sent via broadcast control or the common control channel or the system information broadcast. The configuration message may also be sent via semi-persistent or persistent scheduling wherein the RN listens to the message at pre-determined time-frequency resources. In yet another approach, the configuration message can be dynamically signaled via the Physical Downlink Control Channel (PDCCH). The explicit signaling of possible locations enables the base station to adjust the set of possible locations if needed. For example, an eNB may decide to reserve a certain set of RBs for eNB-to-RN control region and due to backwards compatibility reasons, the eNB may not be able assign portions of RBs used for eNB-to-RN control to support a Release-8 UE1. By explicit signaling of the possible locations, the eNB may be able to dynamically adjust the resources required for the eNB-RN communication based on the traffic served and number of RNs. For example, if the eNB is serving a single RN, it may be able to assign a smaller number of RBs as possible starting locations to reduce the number of decoding attempts required by the RN. Thus in FIG. 3, the signaling of the possible starting locations may occur prior to transmission of the sub-frame for which the starting location information is required. In other implementations, the relay may obtain information on the possible locations from some other source. In one example, the possible starting locations are fixed and defined in a standard specification according to a pre-determined rule. In another example, the set of possible starting locations is not fixed or explicitly signaled. Instead, it can be derived implicitly according to an algebraic rule with variable parameters such as the Radio Network Temporary Identifier (RNTI) of the RN and other parameters as specified by the eNB. Other information signaled by the base station or otherwise obtained by the relay node, and more generally user terminals, includes modulation order, coding rate, coding format, among other information. This information may also be signaled in a higher-layer configuration message or otherwise obtained by the relay node or other terminal to which it pertains.

According to a related aspect of the disclosure, the base station controller is configured to generate the floating control region having a fixed size or a variable size or dimension that is known to the relay node, wherein the base station does not convey the dimension of the second control region to the relay node. Generally, the several possible dimensions of the floating control region are known a priori by the receiving relay terminal that for whatever reason is incapable of receiving the first control region. In some implementations, at 328 in FIG. 3, the base station controller is configured to cause the transceiver to signal the several possible dimensions of the floating control region to the relay terminal without signaling the actual size or dimension of the second control region. The signaling of the possible dimensions of the floating control region may be explicit or implicit. Similar to the explicit signaling of possible starting locations of the floating control region, the base station can send a configuration message via high layers to inform an RN of the possible sizes of the floating control region. The configuration message can be sent during initial system setup or as a dedicated RRC message or via common broadcast message (SIB) or via semi-persistent or persistent scheduled message or using dynamic signaling on the PDCCH. The explicit signaling of possible dimensions will allow the base station to adjust the set of possible dimensions if needed. In other implementations, the relay may obtain information on the possible control region dimensions from some other source. In one example, the possible dimensions are fixed and defined in some standard specification. In another example, the set of possible dimensions is not fixed but not explicitly signaled either. Instead, it can be defined implicitly according to a certain rule and parameters such as the Radio Network Temporary Identifier (RNTI) of the RN. When scheduling resources for an RN, the scheduler in an eNB may utilize the channel quality information (CQI) feedback from the RN or other means to determine an appropriate control channel starting location and dimension to be utilized from a possible starting locations and dimensions.

The location of floating control region, when it is assigned with non-zero resources, is configured to start from a limited set of possible points. The set of possible starting locations of the floating control region may be determined as a function of several variables, including some parameters that are RN-specific or eNB-specific and some other physical parameters such as modulation and number of resources. In the exemplary 3GPP LTE implementation, the starting location is defined in both the frequency and time domain. In another example, the possible dimensions may be defined as a set of multiples of REs, (e.g., {1, 4, 10, 12, 36, 72, 144}) and with a given set of starting locations, e.g., given by the Resource Element with the smallest Subcarrier index and smallest OFDM symbol index, in a set of RBs. Once the possible dimension(s) and starting location(s) are known, the REs may be enumerated in a time-first or a frequency-first manner (or in another pre-determined fashion) to form the possible control region. The set of possible control regions may also be referred to as a search space, as the RN will search this set of possible control regions to find any assignments for itself. Typically the decoding procedure includes a cyclic-redundancy check (CRC) code for detection of successful decoding. RN can use existing Reference Signals that are transmitted from eNB. The control region may also contain reference signals that can be common Reference Signals (CRS) and also possibly dedicated reference signals (DRS), if predefined, for control channel decoding. The Reference Signals are pilots or known waveforms that are transmitted to aid channel estimation and decoding. Since the eNB-to-RN link may experience better channel conditions than a typical mobile UE1, the eNB-RN link may be enhanced by having much more efficient control region (e.g., using higher order modulations such as 16-QAM, or 64-QAM) and different RS structures to support the eNB-to-RN communication. For instance, the configuration message may indicate a varying pilot density or RS structure based on the mobility of RN. For example, a first set of RNs that are fixed (e.g., on top of a building) might be supported with one type of RS structure (e.g., smaller pilot density) whereas a second set of RNs that are mobile (e.g., on top of a bus, etc) may be supported with another type of RS structure (e.g., higher pilot density). Typically, the RB that contains a control region for UE2 may not be allocatable as part of a resource allocation for a Release-8 UE1 and therefore any remaining resources (i.e., REs) in the RB might be allocated to the RN as a resource allocation. Since the RN decodes the possible control region in the RB, the RN may be able to rate-match and determine correctly the resources allocated for its resource allocation. When using localized RB for eNB-to-UE1 link, the eNB scheduler has the flexibility to schedule RN and UE1 traffic according to their frequency-selective fading conditions. When using virtual RB for eNB-to-UE1 link, eNB may still reserve one or more RB Groups (RB Groups of 4 RBs) for RNs.

In one implementation, the base station controller is configured to generate the first control region to convey information for resource allocations within a traffic region of the sub-frame to a first set of users, wherein the first control region and the traffic region are multiplexed temporally. The controller is also configured to generate the second or floating control region to convey information for resource allocations within the traffic region of the sub-frame to the second set of users. In one application, the first set of users is a set of subscriber terminals and the second set of users is one or more relay nodes. The first and second control regions may be generally multiplexed temporally. In one implementation, the second control region and the traffic region are multiplexed temporally. In another alternative implementation, the second control region and the traffic region are multiplexed in frequency. In yet another alternative implementation, the second control region and the traffic region are multiplexed in time and frequency.

Figure 4:
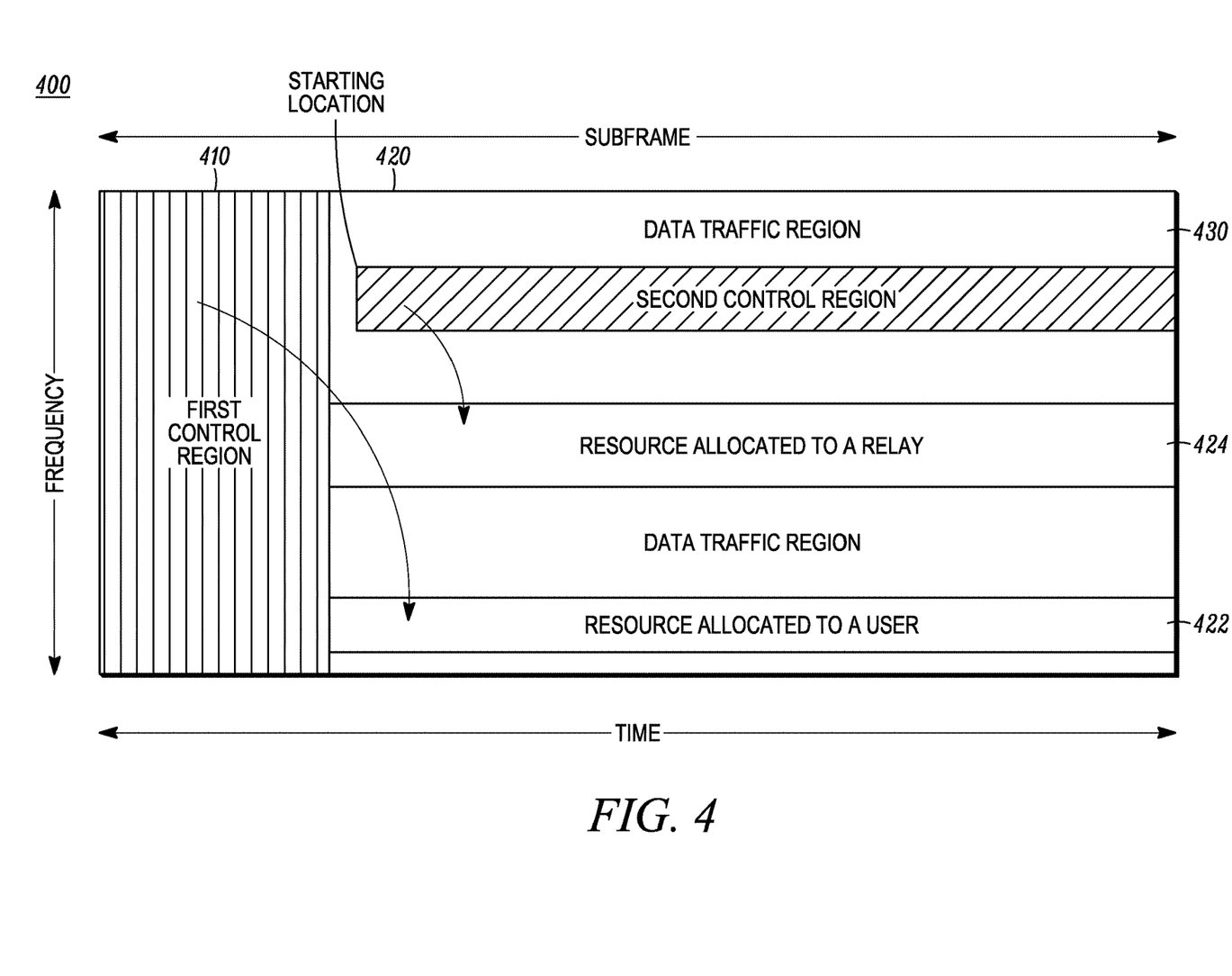
FIG. 4 illustrates a sub-frame having first and second control regions.

In FIG. 4, a sub-frame 400 having time-frequency resources comprises a first control region 410 that has a fixed starting location and may or may not have a fixed dimension. The first control region is temporally multiplexed with a data traffic region 420. In one embodiment, the first control region includes scheduling messages that allocate data traffic region resources to the first set of users. In FIG. 4, for example, the first control region allocates resources 422 to the first set of users. The sub-frame 400 also comprises a second control region 430 that is temporally multiplexed with the first control region. The second control region includes scheduling messages that allocate data traffic region resources to the second set of users. For example, the second control region allocates resources 424 to the relay nodes. The second control region is frequency multiplexed with the data traffic region resources. As discussed, the second control region is a floating control region having a starting location that is one of several possible starting locations known a priori to the relay node. Thus the second control region may be located elsewhere in the data traffic region.

Figure 5:
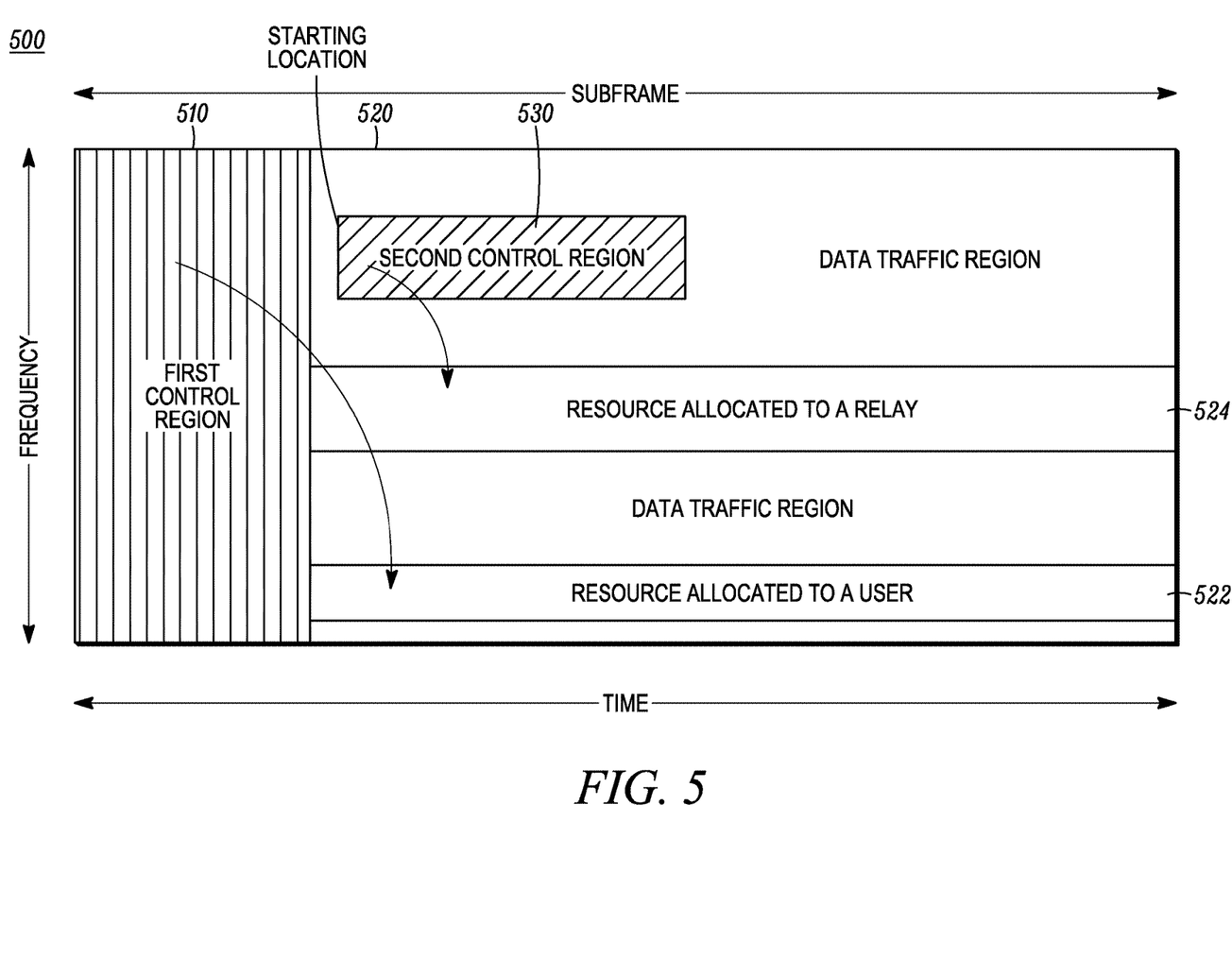
FIG. 5 illustrates an alternative sub-frame having first and second control regions.

In FIG. 5, a sub-frame 500 having time-frequency resources comprises a first control region 510 that has a fixed starting location and may or may not have a fixed dimension. The first control region is temporally multiplexed with a data traffic region 520. The first control region includes scheduling messages that allocate data traffic region resources 522 to the first set of users. The sub-frame 500 also comprises a second control region 530 that is temporally multiplexed with the first control region. The second control region includes scheduling messages that allocate data traffic region resources 524 to one or more relay nodes. The second control region is multiplexed in frequency and time with the data traffic region resources and may be located in one of several possible starting locations that are known a priori to or by the relay node.

A wireless communication terminal for example, a relay node (RN), comprises a transceiver coupled to a controller. In one embodiment, the controller is coupled to memory and is embodied as a programmable digital controller capable of executing software of firmware code stored in memory. The code configures the controller to perform functionality discussed more fully below. Alternatively, the controller may be implemented as a hardware equivalent of the exemplary digital controller or as a combination of hardware and software.

The RN transceiver is configured to receive, in at least some instances, only a portion of a sub-frame transmitted by a network base station, for example, by an eNB. The sub-frame transmitted by the base station includes a first control region with a fixed starting location within the sub-frame and second control region, wherein a starting location of the second control region is at one of several possible starting locations within the sub-frame. The portion of the sub-frame received by the RN, however, excludes at least a portion of the first control region.

The RN controller includes decoding functionality wherein the controller is configured to detect the second control region within the portion of the sub-frame received by attempting to decode information in a possible control region having at least one of the several possible starting locations. As noted, the RN controller has a priori knowledge of the possible starting locations prior to decoding and of the size or possible sizes of the floating control region. Thus the controller may "blindly" detect the floating control region by attempting to decode information in the received sub-frame beginning at the possible starting locations. The decoding information conveyed in the floating control region, performed at the RN under different control region hypotheses, may also require the necessary parameters about the transmission format including modulation order, types of coding, and its rate. These parameters may be known a priori before any decoding attempt. In embodiments where the size of the floating control region varies from one sub-frame to the next, the controller is configured to detect the floating control region by attempting to decode information based on one of several possible sizes that are known a priori by the relay terminal. Decoding is simplified in embodiments where the control region has a known fixed dimension. As suggested above, the possible starting locations and size or possible sizes of the floating control region may be communicated to the relay node in a higher-layer message or by other means. Other information known generally by the RN controller prior to decoding may include modulation order, coding rate, coding format, among other information.

Thus generally, the floating control region or channel of the eNB-to-RN link sub-frame contains control messages to all RNs associated with the eNB. The starting location of the control channel within the sub-frame is pre-defined (via RN-specific search space and/or RN-common search space or a search space that is common to a group of RNs) and the size of control channel in terms of occupied resources is limited to a set of values or is fixed. Each RN blindly decodes the control channel based on all hypotheses, i.e., the known possible starting locations and size(s) of the control regions. Upon successful blind detection, the RN will learn about any resource assigned and the location and size. Since the RN is required to blindly detect zero or non-zero resources occupied by the control channel of the eNB-to-RN link, the base station has more flexibility to serve UE1 by assigning any of the remaining resources. Also, for instances where there is no eNB-to-RN traffic, the eNB can provide all resources to UE1. No control signaling overhead is required informing the RN since the RN uses blind detection to obtain resource assignments.

Thus in some instances the relay terminal controller is configured to cause the transceiver to transmit a first portion of a first sub-frame during a first time-frequency region to a wireless communication device and to cause the transceiver to receive, from a base station, a portion of a second sub-frame during a second time-frequency region wherein the first and second time-frequency regions are non-overlapping. In one embodiment, the first and second time-frequency regions are separated by a time interval. In another embodiment, the first and second time-frequency regions are an integer number of OFDM symbols. In another embodiment, the first and second time-frequency regions are an integer number of time units.

In one embodiment, the first sub-frame is a multimedia broadcast multicast over a single frequency network sub-frame. In the exemplary LTE implementation, the first portion of the first sub-frame includes a physical downlink control channel (PDDCH). The portion of the first sub-frame includes a first control region having scheduling messages. In some embodiments, the first sub-frame is a non-unicast sub-frame. In other embodiments, the first and second sub-frames are separate from a sub-frame containing a paging channel transmitted by the terminal. In the exemplary embodiment, the portion of the second sub-frame includes a second control region corresponding to the possible control region having scheduling messages. In some embodiments, the portion of the second sub-frame includes a data region that is distinct in time-frequency from the second control region.

The relay terminal controller is configured to detect a control region within the portion of the second sub-frame received by attempting to decode information in a possible control region of the second sub-frame having at least one of several possible starting locations that are known a priori by the terminal. The controller is also configured to detect the second control region within the portion of the sub-frame received by attempting to decode information in the possible control region having a dimension that is also known a priori by the terminal. In some embodiments, the relay terminal decodes the possible second control region in a time interval non-overlapping a time interval corresponding to the first control region.

Figure 6:
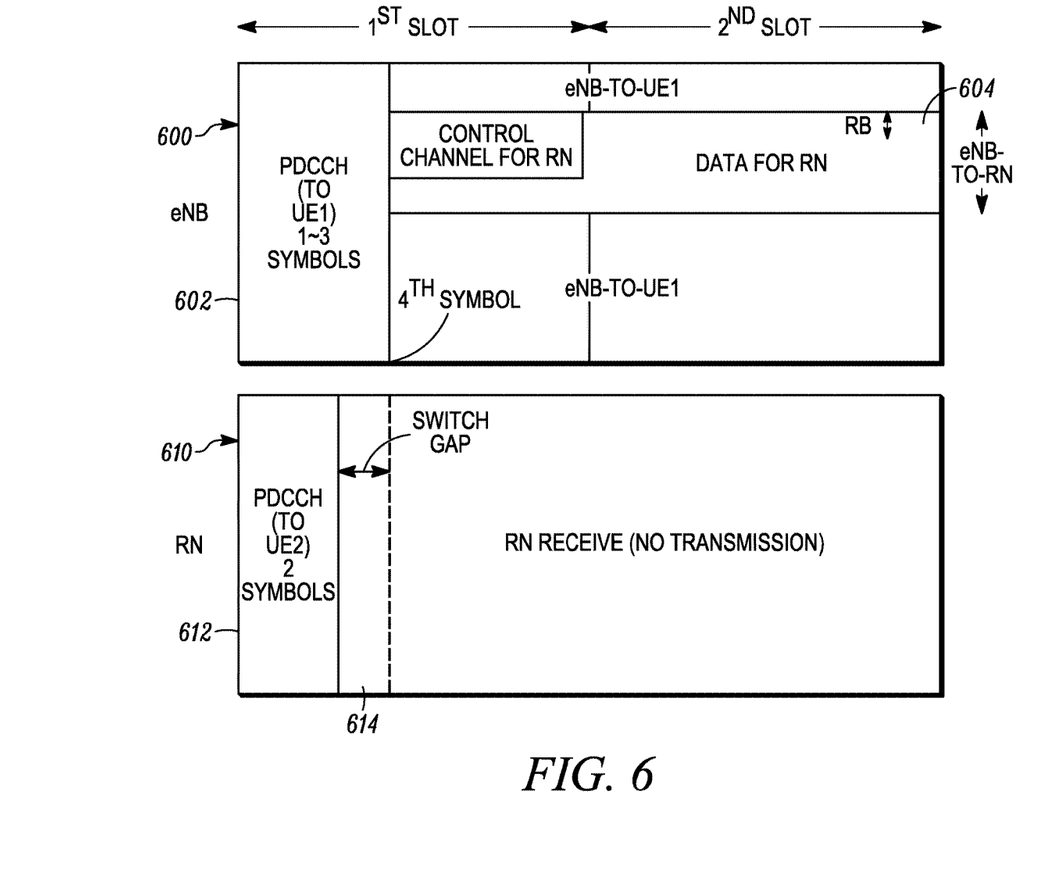
FIG. 6 illustrates a first sub-frame transmitted by an eNB and a second sub-frame transmitted by a relay node.

FIG. 6 illustrates a first 3GPP LTE-specific sub-frame 600 transmitted by an eNB comprising a PDCCH 602 and a control channel 604 for an RN. FIG. 6 also illustrates a second sub-frame 610 transmitted by a relay node with a PDCCH 612 and a switch gap 614. The 1-3 symbols of each sub-frame are allocated to the physical downlink control channel (PDCCH) targeted to UE1, e.g., subscriber terminals. Whenever the RN is expecting DL data from the eNB in a second sub-frame, RN signals to the UE2 that the first sub-frame is a special sub-frame or a non-unicast sub-frame and hence the UE2 may read only the first one or two (or possibly zero) OFDM symbols from the RN DL transmission on the second sub-frame. RN may be able to transmit "blank", "empty" or "no transmission" in the rest of the first sub-frame. The blank or empty may comprise not transmitting any reference signals or control or data. It may also be noted that the rest of the first sub-frame may include some additional transmissions for some reserved purposes such as preamble transmission, etc. It is can be seen that the RN can receive the DL transmission from the eNB and search the possible second control region to find data for the RN. The characterization of the sub-frames as a first sub-frame and a second sub-frame are used here although the two sub-frames may occur contemporaneously to indicate that these two sub-frames represent the downlink transmissions from two different cells or cell sites or entities, one is associated with the eNB and another is associated with the relay. While FIG. 6 represents a frequency division multiplexing (FDM) of control and data within the eNB-to-RN link sub-frame, time division multiplexing (TDM) is also possible. In the FDM case, the total number of REs available for the floating control channel in each sub-frame over a sub-band of 12 subcarriers, including CRS, are N*11 symbols*12 subcarriers=N*132 REs, where is N is the number of possible starting locations (or RBs in this example). The RN may be required to buffer the sub-frame prior to decoding so there may be additional latency compared with TDM control channel. However, such an additional processing latency may be tolerable because typically RN-reception frames may have low duty cycle given that the RN also needs to transmit in other frames. In the case of TDM control, the size of control in time domain could be a fraction of the sub-frame (e.g., 4 symbols in the first slot, or 7 symbols in the second slot). In the frequency domain, the number of occupied sub-carriers could be made equal to the occupied bandwidth of the entire eNB-to-RN link. This value is an integer number of 12 subcarriers which may also be detected by the RN. It is noted that either TDM or FDM control or a combination of both within eNB-to-RN link can be supported.

PDCCH contains the control information about the downlink control information (DCI) formats or scheduling messages, which inform the UE of the modulation and coding scheme, transport block size and location, precoding information, hybrid-ARQ information, UE Identifier, etc that is required to decode the downlink data transmissions. This control information is protected by channel coding (typically, a cyclic-redundancy check (CRC) code for error detection and convolutional encoding for error correction) and the resulting encoded bits are mapped on the time-frequency resources. For example, in LTE Rel-8, these time-frequency resources occupy the first several OFDM symbols in a sub-frame. A group of four Resource Elements is termed as a Resource Element Group (REG). Nine REGs comprise a Control Channel Element (CCE). The encoded bits are typically mapped onto either 1 CCE, 2 CCE, 4 CCE or 8 CCE. These four are typically referred to as aggregation levels 1, 2, 4 and 8. The UE searches the different hypotheses (i.e., hypotheses on the aggregation level, DCI Format size, etc) by attempting to decode the transmission based on allowable configurations. This processing is referred to as blind decoding. To limit the number of configurations required for blind decoding, the number of hypotheses is limited. For example, the UE does blind decoding using the starting CCE locations as those allowed for the particular UE. This is done by the so-called UE-specific search space, which is a search space defined for the particular UE (typically configured during initial setup of a radio link and also modified using RRC message). Similarly a common search space is also defined that is valid for all UEs and might be used to schedule broadcast downlink information like Paging, or Random access response, or other purposes.

The transmission of the PDCCH from the RN to the UE2 typically requires 2 symbols in frames that the RN needs to receive from the eNB, for example, non-unicast sub-frame with the first one or two (or possibly zero) OFDM symbols being PDCCH and common RS for up to 4 or more antennas. Assuming 1 symbol of transmit-to-receive switch gap in RN, the RN can start its reception of the sub-frame transmitted by the base station from the $4^{th}$ symbol. Under this assumption, the starting position of the floating control channel can be set as early as the $4^{th}$ symbol. In FIG. 6, the control channel of eNB-to-RN link is FDM with eNB-to-UE1 link. FDM enables efficient resource sharing between the eNB-to-RN and eNB-to-UE1 link. The occupied bandwidth of the control channel is in multiples of 12 sub-carriers, the same as the number of sub-carriers in an RB. The RN blindly decodes control information in the sub-frame. For example, assuming "N" starting positions and "M" RBs for the control channel, the number of blind detection will be "NM".

The size of the floating control channel for RN may be defined similar to the REG/CCE/aggregation level as defined previously for UE1. However, it might be possible to define a new control channel structure. For instance, it may be advantageous to limit each control channel to subcarriers within the first slot to reduce decoding latency. In another instance, it may be advantageous to limit the control channel for a RN to a small number of Resource Blocks so that the remaining Resource Blocks can be assigned to a Release-8 UE1. In yet another example, it might be advantageous to limit the control channel for a RN to a small number of virtual Resource Blocks thus benefitting from frequency diversity but at the same time the remaining Resource Blocks can be assigned to a Rel-8 UE. For simplicity, the other control information such as a physical control format indicator channel (PCFICH), physical Hybrid-automatic repeat request Indicator channel (PHICH), etc. are left out of this description, but it should be apparent to those skilled in the art that the different channels are multiplexed into the control region. At this point, it is also noted that the uplink transmissions from UE2-to-RN and the RN-to-eNB also need to be time-multiplexed as the RN may not be able to simultaneously receive from UE2 while the RN is concurrently transmitting to eNB. It is noted that the RN can efficiently use the control signaling in 1st few OFDM symbols to send appropriate scheduling messages to reduce or minimize UE2 uplink transmissions whenever required. In cases where the RN is unable to inhibit UE2 uplink transmissions such as sounding reference symbol, Random Access, Channel quality indicator (CQI), etc. and RN needs to transmit on the uplink to the eNB, it may choose to ignore UE2 uplink transmissions, which might lead to some additional interference. Alternatively, the RN may send a specific message via the PDCCH (broadcast or unicast) to the UE2 to disable their uplink transmissions.

Figure 7:
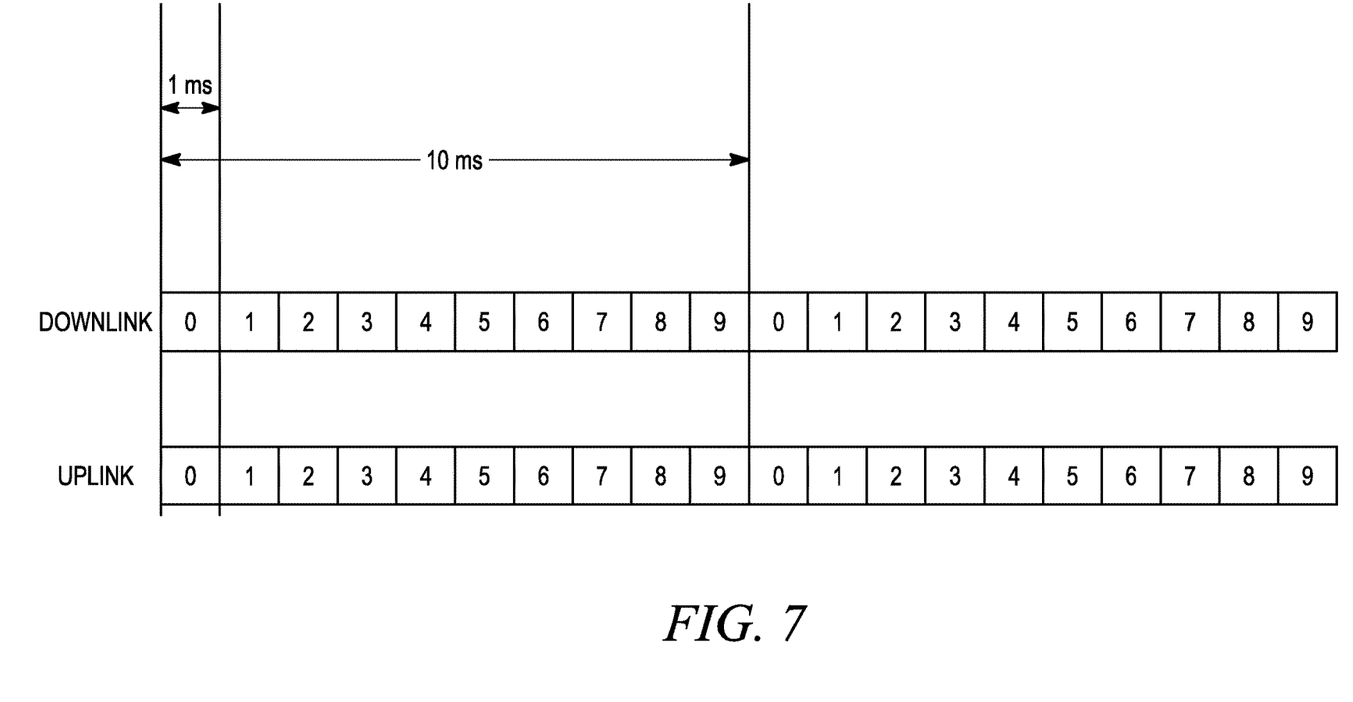
FIG. 7 illustrates a frame structure for uplink and downlink FDD with 1 ms sub-frames labeled 0 to 9 with a 10 ms Radio Frame.

FIG. 7 shows a high-level diagram of a typical frame structure for frequency division duplex operation (FDD). A 10 ms radio frame comprises ten downlink sub-frames and ten uplink sub-frames. Typically, the primary broadcast control is transmitted in sub-frame 0 and synchronization channels are sent sub-frames 0 and 5. The paging messages may be sent in sub-frames 0 and 5 and depending on additional system capacity sub-frame 4 and sub-frame 9 may occasionally be used for a paging channel. For UEs to receive paging and system information messages, the sub-frames 0, 5 are reserved as "normal" or "unicast" sub-frames containing common reference symbols. Some other sub-frames may be occasionally characterized as special sub-frames or non-unicast sub-frames, for example, Multimedia Broadcast Multicast Service over a Single Frequency Network (MBSFN) sub-frames, wherein the sub-frame structure is different from a unicast sub-frames. In the special sub-frames or non-unicast sub-frames, the first one or two (or possibly zero) OFDM symbols may contain the PDCCH and reference symbols, whereas the rest of the sub-frame including the RS structure may be different than a unicast sub-frame. For instance, the multimedia multicast broadcast over single frequency network (MBSFN) sub-frame is a type of non-unicast sub-frame. The non-unicast sub-frame may also be referred to as a non-Release-8 sub-frame and may be used for new features in future releases. Therefore, a UE that does not support MBSFN or non-unicast sub-frame may be able to save battery life by turning the transceiver off on such sub-frames. It may also be possible to define some sub-frames as empty or blank sub-frames. The non-unicast (or special sub-frame) signaling pattern may be part of system configuration or System Information Broadcast (SIB) message and may be defined on a Radio-frame level or for a group of Radio Frame level. The periodicity of MBSFN (or special sub-frame) signaling may be defined on a 8 ms or 10 ms periodicity with occasional overriding by the unicast sub-frames to transmits the primary broadcast or synchronization messages. It is noted that there may be more than one type of special sub-frame, example, an MBSFN sub-frame, blank sub-frame, etc.

Figure 8:
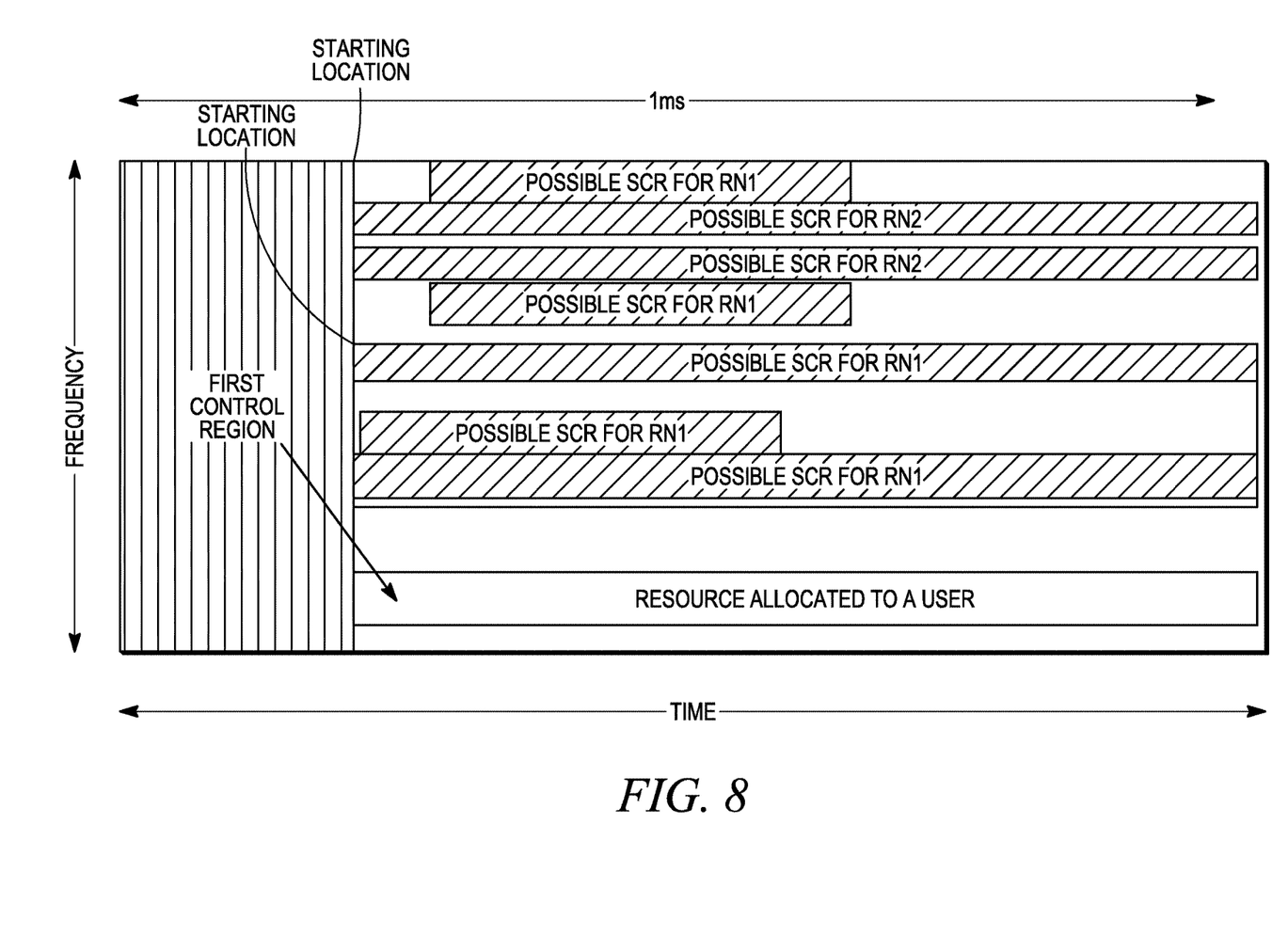
FIG. 8 illustrates possible starting points and possible size for second control region for a first group of RNs (RN1) and a second group of RNs (RN2).

FIG. 8 shows diagram of an eNB downlink transmission to one or more relay nodes where RN1 is relay node 1 and RN2 is relay node 2. More generally, RN1 may be a first group of RNs and RN2 may be a second group of RNs. FIG. 8 also shows an example of more than one possible starting location for the second control region for RN1 and RN2. The RN1 decodes the different control region to find its resource allocation. It may be possible for an RN to receive more than one resource allocation, with the same or different time-frequency resources, in a sub-frame. This might be advantageous when an RN has more than one TB allocation in the sub-frame. For clarity, the possible second control regions in FIG. 8 are represented with abbreviated notation SCR.

Figure 9:
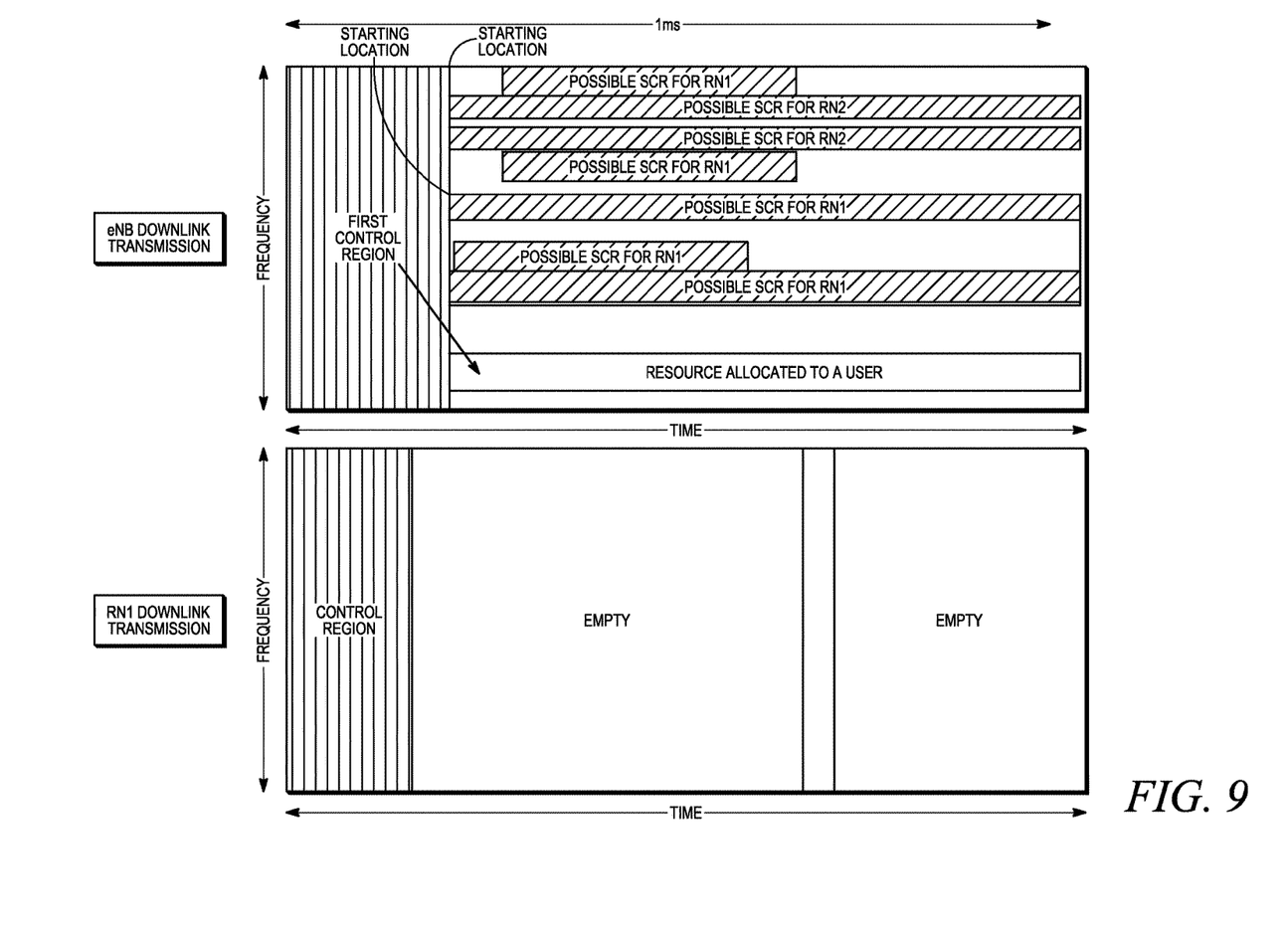
FIG. 9 illustrates a first sub-frame transmitted by an RN on the downlink with a control region and a second sub-frame transmitted by an eNB comprising a first control region, and a second portion of second sub-frame showing possible starting points and possible size for second control region for a first group of RNs (RN1) and a second group of RNs (RN2).

A Relay or RN can take advantage of the MBSFN signaling to transmit to UE2 and receive from eNB with a sub-frame. FIG. 9 shows diagram of a eNB downlink transmission to an RN1 on the top and a corresponding RN1 transmission to a UE2 on the bottom. Whenever RN1 is expecting DL data from the eNB in a sub-frame, RN1 signals to the UE2 that the sub-frame is an MBSFN sub-frame and hence the UE2 may read only the first one or two (or possibly zero) OFDM symbols from the RN1 DL transmission. RN1 may be able to transmit "empty" or "blank" in the rest of the sub-frame. The blank or empty may comprise not transmitting any reference signals or control or data. It may also be noted that the rest of the sub-frame may include some additional transmission. It is can be seen that the RN1 can receive the DL transmission from the eNB and search the possible second control region to find data for RN1. Generally, RN1 may be a first group of RNs and RN2 may be a second group of RNs.

Typically, control information is transmitted about the downlink control information (DCI) formats, which inform the UE of the modulation and coding scheme, transport block size and location, precoding information, hybrid-ARQ information, UE Identifier, etc that is required to decode the downlink data transmissions. This control information is protected by channel coding (typically, a cyclic-redundancy check (CRC) code for error detection and convolutional encoding for error correction) and the resulting encoded bits are mapped on the time-frequency resources. For example, in LTE Rel-8, these time-frequency resources occupy the first several OFDM symbols in a sub-frame. Typically in the LTE example, a group of four Resource Elements is termed as a Resource Element Group (REG). Nine REGs comprise a Control Channel Element (CCE). The encoded bits are typically mapped onto either 1 CCE, 2 CCE, 4 CCE or 8 CCE. These four are typically referred to as aggregation levels 1, 2, 4 and 8. The UE searches the different hypotheses (i.e., hypotheses on the aggregation level, DCI Format size, etc) by attempting to decode the transmission based on allowable configurations. This processing is referred to as blind decoding. To limit the number of configurations required for blind decoding, the number of hypotheses is limited. For example, the UE does blind decoding using the starting CCE locations as those allowed for the particular UE. This is done by the so-called UE-specific search space, which is a search space defined for the particular UE (typically configured during initial setup of a radio link and also modified using Radio Resource Configuration (RRC) message). Similarly a common search space is also defined that is valid for all UEs and might be used to schedule broadcast downlink information like Paging, or Random access response, or other purposes.

While the present disclosure and the best modes thereof have been described in a manner establishing possession by the inventors and enabling those of ordinary skill to make and use the same, it will be understood that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A wireless communication relay terminal comprising:
   a transceiver,
   a controller coupled to the transceiver,
   the controller configured to cause the transceiver to transmit a first portion of a first sub-frame during a first time-frequency region to a wireless communication device,
   the controller configured to cause the transceiver to receive, from a base station, a portion of a second sub-frame during a second time-frequency region wherein the first and second time-frequency regions are non-overlapping,
   the controller configured to detect a control region within the portion of the second sub-frame received from the base station by attempting to decode information in a possible control region of the second sub-frame, the possible control region having at least one of several possible starting time locations that are known a priori by the relay terminal.

2. The relay terminal of claim 1, the controller configured to cause the transceiver to receive, from the base station, the portion of the second sub-frame during the second time-frequency region wherein the first and second time-frequency regions are separated by a time interval.

3. The relay terminal of claim 2, the time interval separation of the first and second time-frequency regions is an integer number of OFDM symbols.

4. The relay terminal of claim 2, the time interval separation of the first and second time-frequency regions is an integer number of time units.

5. The relay terminal of claim 1, the controller configured to detect the control region within the portion of the second sub-frame received by attempting to decode information in the possible control region having a dimension that is known a priori by the relay terminal.

6. The relay terminal of claim 1, the first portion of the first sub-frame includes a physical downlink control channel.

7. The relay terminal of claim 1, the first sub-frame is a non-unicast sub-frame.

8. The relay terminal of claim 1, the first sub-frame is a multimedia broadcast multicast over a single frequency network sub-frame.

9. The relay terminal of claim 1, the relay terminal decodes the possible control region in a time interval non-overlapping a time interval corresponding to a first control region of the first sub-frame.

10. The relay terminal of claim 1, the first and second sub-frames are separate from a sub-frame containing a paging channel transmitted by the relay terminal.

11. The relay terminal of claim 1, the first portion of the first sub-frame includes a first control region having scheduling messages.

12. The relay terminal of claim 1, the portion of the second sub-frame includes a second control region corresponding to the possible control region having scheduling messages.

13. The relay terminal of claim 12, the portion of the second sub-frame includes a data region that is distinct in time-frequency from the second control region.

* * * * *